April 16, 1935.    F. KLEIN    1,997,642
CINEMATIC MACHINE
Filed June 21, 1933
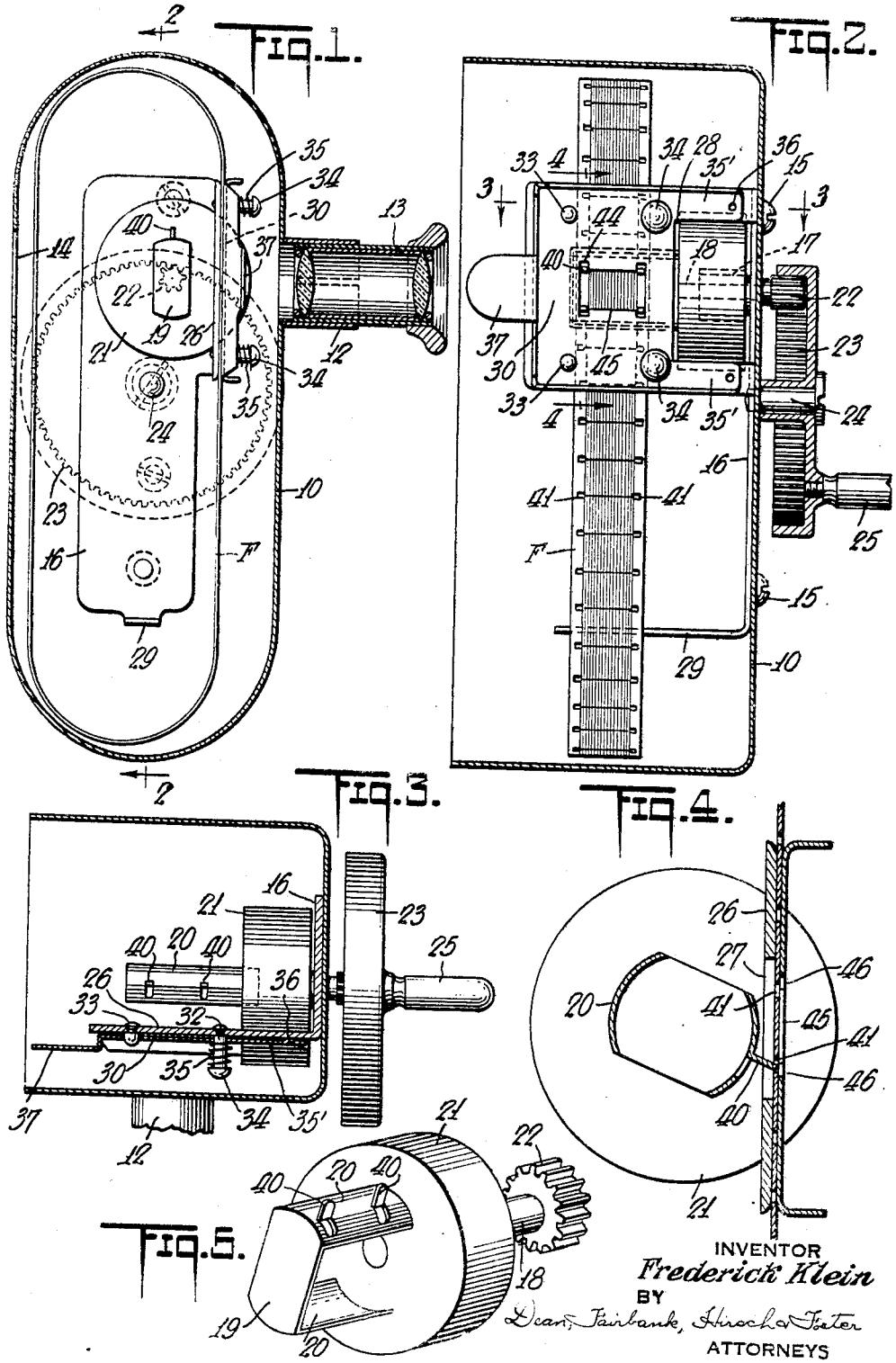
INVENTOR
*Frederick Klein*
BY
*Dean, Fairbank, Hirsch & Foster*
ATTORNEYS Patented Apr. 16, 1935

1,997,642

UNITED STATES PATENT OFFICE 1,997,642

CINEMATIC MACHINE

Frederick Klein, College Point, N. Y.

Application June 21, 1933, Serial No. 676,777

5 Claims. (Cl. 88—18.5)

My present invention is shown exemplified in a moving picture machine, although certain of the broader aspects of the invention are applicable to other optical apparatus.

A generic object of the invention is to provide a simple optical shutter structure affording direct coordination with respect to an optical object or objects to be viewed in a predetermined sequence of positions.

As applied to moving picture machines, the invention seeks to provide an inexpensive structure not likely to become deranged and capable of convenient operation by the general public.

Another object is to reduce the moving parts of the apparatus to a minimum to eliminate reciprocating or intermittently moving mechanism and thus to obviate noise and vibration.

Another object is to provide a mechanism of the above type convenient for viewing the moving picture film without the necessity of artificial light, dark room, or screen.

Another object is to provide a moving picture machine of the above type which lends itself readily to use of an endless film reel structure of the type shown in my copending application Serial No. 676,778, filed June 21, 1933, and since patented February 19, 1935 under No. 1,991,394.

Other objects will be in part obvious and in part pointed out hereinafter.

In the accompanying drawing in which is shown one of various possible embodiments of the several features of my invention, Fig. 1 is a view in longitudinal cross section through the mechanism, Fig. 2 is a view in longitudinal cross section taken along the line 2—2 of Fig. 1, Fig. 3 is a view in transverse cross section taken on line 3—3 of Fig. 2.

Fig. 4 is a detail view on a larger scale in longitudinal cross section taken on line 4—4 of Fig. 2, and Fig. 5 is a perspective view of the shutter-drive unit.

Referring now to the drawing there is shown a vertical elongated casing 10 which houses the mechanism and the film roll. The casing has a split sleeve 12 which houses the eyepiece 13, protruding from the front of the case. At the wall opposite the eyepiece and aligned therewith is an aperture 14 through which light is admitted when looking through the eyepiece to view the film.

Fastened within the case, as by suitable screws 15, is a unitary carrying frame 16 which supports all of the mechanism as well as the film, as more fully described hereinafter. The frame 16 has affixed thereto and protruding inward therefrom a journal sleeve 17 through which extends and in which bears the shaft 18 for the shutter 19. The shutter 19 is preferably a so-called barrel shutter comprising a single metal stamping shaped as a mutilated barrel with a segment base 19 and arcuate legs 20 between which the metal is cut away affording aligned openings through which the film is exposed. The shutter is generally U-shaped in cross section and its legs are affixed concentrically with the flywheel 21, the latter in turn affixed to the shaft 18.

The forward end of shaft 18 has a pinion 22 meshing with an internal gear 23, the latter journaled on stud 24 affixed to and protruding from the case 10. Internal gear 23 is provided with a crank handle 25 so that manual revolution imparts rotation to the shutter shaft 18 and the flywheel 21 at a multiplied speed. The main frame 16 has a rearwardly extending portion 26 parallel to the shutter axis and apertured at 27 to afford a gate aligned with the eyepiece 13 and the aperture 14. This portion is further apertured at 28 to afford clearance for the flywheel 21. Gate 27 is of width slightly less than the full width of the film F, while the vertical dimension of gate 27 is substantially equal to that of a frame of the film.

The film is continuous in the form of an endless roll mounted on a carrier 29 of the carrying frame 16, said endless film roll structure being preferably that of my copending application Serial No. 676,778, filed June 21, 1933 and since patented February 19, 1935, under No. 1,991,394. The film is preferably retained in proper position relative to the gate by means of a gate cover 30, perforated substantially in the same manner as the gate plate 26. Two pair of studs 32 and 33 protrude from the gate plate and are spaced by the width of the film to guide the latter. Studs 32 are headed as at 34 and are surrounded by coil springs 35 yieldingly pressing the gate cover toward the plate to retain the same yieldingly in position between the main gate plate 26 and the gate cover 30. The gate cover has heel pieces 35 straddling the flywheel which are provided with slight embossments or indentations 36 of approximately the average thickness of the film, thereby to afford a substantially even grip on the film.

The gate cover has a finger piece 37 protruding from its rear edge and when the latter is lifted the gate pivots about embossments 36 as a fulcrum and may be caused to clear the studs 33 to permit insertion and removal of the film.

According to the present invention the shutter has a simple direct driving connection with respect to the film.

In the preferred embodiment, as best shown in Figs. 4 and 5, one leg 20 of the barrel shutter has upstruck prongs 40 spaced from each other by the space between aligned sprocket holes 41 on the film. These prongs, as best shown in Fig. 4, enter into engagement with such aligned film sprocket holes 41 and correspondingly advance the film during the period of engagement of said sprocket teeth with the film sprocket holes.

For this purpose, as appears best in Figs. 2 and 4, the gate has on each side thereof extension recesses 44 affording clearance for the prongs 40, as they enter and as they leave the gate 27 proper. Similarly the gate cover has an aperture 44 aligned with the gate which aperture also is extended at its lateral edges, as at 46, in the path of movement of the shutter prongs.

It will thus be apparent that as the shutter is continuously rotated the prongs 40 enter into the gate 27 to engage sprocket holes 41 of the film and in their progress advance the film, overcoming the frictional hold between the gate plate and gate cover. By the time the prongs 40 have moved out of the range of the film, the latter will have been advanced through the width of just one frame and will be exposed to the light without further movement while the shutter is open.

Preferably the prongs, as shown, are only on one leg of the shutter so that the film remains in fixed position during the major portion of the shutter rotation, which defines two longer periods of exposure separated by a short period of eclipse defined by the traverse of the eclipsing leg opposite that carrying the prongs. Of course, the parts could be so timed that driving prongs are on each leg of the shutter, but this arrangement is more apt to give rise to flicker.

Thus in the normal operation of the machine the shutter at each complete rotation thereof will advance the film through the width of one frame, and between successive advances the film will be exposed to view.

By this arrangement the expense and complication of transmission or special timing mechanism is eliminated as is also the noise and vibration, due to intermittent movements.

By turning the crank in counter-clockwise rather than in clockwise direction, the action of the film may be reversed but with an endless roll, of the type preferred and shown in my copending application above identified, such reverse movement would be objectionable as the film would not rewind itself in reverse direction. In that case it would be advisable to provide a snubber of any conventional construction or a ratchet (not shown) against the internal gear 23 or the pinion 22 to prevent reverse rotation.

Obviously by placing the apparatus in inverted position in front of a source of light equipped with a condenser, it is possible to project the image upon a screen and, of course, such application comes within the scope of the invention disclosed and claimed.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention what I claim as new and desire to secure by Letters Patent is:

1. In a cinematic machine, the combination of a flywheel, a rotating barrel shutter unitary with said flywheel, means on said shutter directly to engage perforations of the film at alternate periods of eclipse, a common shaft for said flywheel, and said shutter, said shaft having a pinion thereon, an internal gear meshing with said pinion, and a crank-handle on said gear.

2. A cinematic machine comprising the combination of a casing, a drive shaft bearing in said casing, having a pinion at the exterior of said casting, a flywheel rigid therewith within said casing and a barrel shutter rigid with said flywheel, film mounting means within said casing, means driving said mounted film intermittently at alternate optical closures in the revolution of the barrel shutter and speed multiplying manual driving means at the exterior of said casing, coacting with and enclosing said pinion.

3. A cinematic machine comprising the combination of a carrying frame, a shaft bearing therein, having a driving pinion at the outer end thereof, and a flywheel and a barrel shutter on the inner length of said shaft and rigid with said shaft, a film gate constituting part of said frame, a gate closure, four freely penetrating studs fastened to said frame, yieldingly retaining said gate closure in position, said studs being in two pairs spaced by the width of the film and serving as edge guides therefor, means on the shutter to intermittently move the film past the gate, an internal gear meshing with said pinion and a crank-handle carried by said gear.

4. As an article of manufacture, a shaft having a flywheel rigid therewith, and an optical barrel shutter comprising a unitary piece of metal having the shape of a mutilated barrel, with diametrically opposite segments removed, said shutter rigidly affixed to said flywheel, and substantially concentric therewith, said barrel having outstanding teeth at one side thereof, adapted to register with opposite sprocket holes of the film.

5. A cinematic machine comprising the combination of a casing, a barrel shutter, and a flywheel rigid therewith, forming a single rotary element therein, an opening on the side of the casing to insert the film roll, an aperture in the front of the casing through which the film is exposed, another aperture in the rear of the casing through which light is admitted to the film, the optical axis of both apertures intersecting the axis of said shutter and flywheel, said shutter having two opaque regions to cause two optical eclipses per revolution, either or both opaque portions including prongs to engage the perforations of the film, thereby to impart intermittent motion to the film during eclipse, manual means and a gear couple external to said casing to impart rotation to said shutter and flywheel, the latter to maintain a substantially uniform period of eclipse and exposure against the applied load of the film during eclipse.

FREDERICK KLEIN.